United States Patent [19]

Jacobson et al.

[11] 4,217,225
[45] Aug. 12, 1980

[54] CRADLE SYSTEM

[75] Inventors: Albert Jacobson, Huntingdon Valley, Pa.; Solomon Moskovitz, Margate, N.J.

[73] Assignee: Miracle Core Chemical Industries, King of Prussia, Pa.

[21] Appl. No.: 949,203

[22] Filed: Oct. 6, 1978

[51] Int. Cl.² .............................................. B01D 35/16
[52] U.S. Cl. .................................................. 210/236
[58] Field of Search ................ 210/232, 236, 330, 488

[56] References Cited

U.S. PATENT DOCUMENTS

| | | | |
|---|---|---|---|
| 1,091,947 | 3/1914 | Morgan | 210/236 |
| 2,732,079 | 1/1956 | Hunziker | 210/236 |
| 2,765,083 | 10/1956 | Purmort | 210/236 |
| 2,936,075 | 5/1960 | Davis | 210/236 |
| 2,979,204 | 4/1961 | Yeiser | 210/236 X |
| 3,252,577 | 5/1966 | Anderson | 210/236 |
| 3,310,171 | 3/1967 | Schmidt, Jr. et al. | 210/236 |
| 4,047,623 | 9/1977 | Bleutt et al. | 210/236 |

*Primary Examiner*—Theodore A. Granger
*Attorney, Agent, or Firm*—Paul Maleson

[57] ABSTRACT

A cradle system used in purification systems for releasably capturing and reversibly displacing a set of cylindrically contoured filter cartridges mounted thereon. The cradle system includes at least a first longitudinally extending cradle frame having a pair of first rod members within which the filter cartridges are mounted. At least a second longitudinally extending cradle frame having a pair of longitudinally extending and transversely displaced second rod members is coupled to the first cradle frame. Coupling is provided by a cradle rotational securement mechanism which constrains the first cradle frame to the second cradle frame but allows rotational displacement of one cradle frame with respect to another.

10 Claims, 5 Drawing Figures

CRADLE SYSTEM

BACKGROUND OF THE INVENTION

1. Field of the Invention

This invention relates to purification systems. In particular, this invention relates to systems for holding filter cartridges within filter tube tanks of purification systems. Still further, this invention pertains to cradle systems for releasably capturing filter cartridges thereon. More in particular this invention pertains to cradle systems which are removably displacable from internal to a filter tube tank. More in particular this invention relates to cradle systems for holding filter cartridges where such cradle systems include scraping elements for cleaning the internal surfaces of a filter tube tank when the cradle system is longitudinally removed from the filter tube tank. Still further, this invention relates to cradle systems forming a plurality of cradle frames which are rotationally displaceable each with respect to the other.

2. Prior Art

In prior art purification systems, filter cartridges are inserted within a filter tube tank, generally without the benefit of a cradle system. In such prior art purification systems, filter cartridges are manually removed through use of a rod member having a hook like element on one end. In such systems, the users attempts to engage a cartridge by the hook like member and removeably displaces such external to the filter tube tank.

In such prior systems, the utilization of the rod member provides for increased space area necessitated by the length of the rod. Thus, purification systems of this prior art type must be utilized within a volume space of large proporations. This has the disadvantage of the maintenance of a large space which generally is not usable for other purposes.

In other prior art purification systems, the interior surface of filter tube tanks are cleaned out manually by utilization of a rod member having a rounded plate section at one end thereof. The operator passes the rod member internal to the filter tube tank and scraps out the contaminant particulates from the inner surface of the tank.

In such prior art systems, the cleaning process must generally be accomplished subsequent to the removal of the filter cartridges. Thus, the cleaning operation is expensive and time consuming. In such prior systems, the removal and cleaning operation are not provided in a simultaneous action.

SUMMARY OF THE INVENTION

A cradle system for releasably capturing and reversably displacing a set of cylindrically contoured filter cartridges within and at least partially external to a filter tube tank. The cradle system includes a first longitudinally extending cradle frame. The first cradle frame includes at least a pair of longitudinally extending and transversely displaced first rod members where the first rod members are fixedly secured each to the other. A second longitudinally extending cradle frame is provided in the cradle system. The second cradle frame includes at least a pair of longitudinally extending and transversely displaced second rod members where the second rod members are fixedly secured each to the other. Cradle rotational securement mechanism is coupled to a second end section of the first cradle frame and a first end section of the second cradle frame.

DESCRIPTION OF THE PREFERRED EMBODIMENTS

Figure 1:
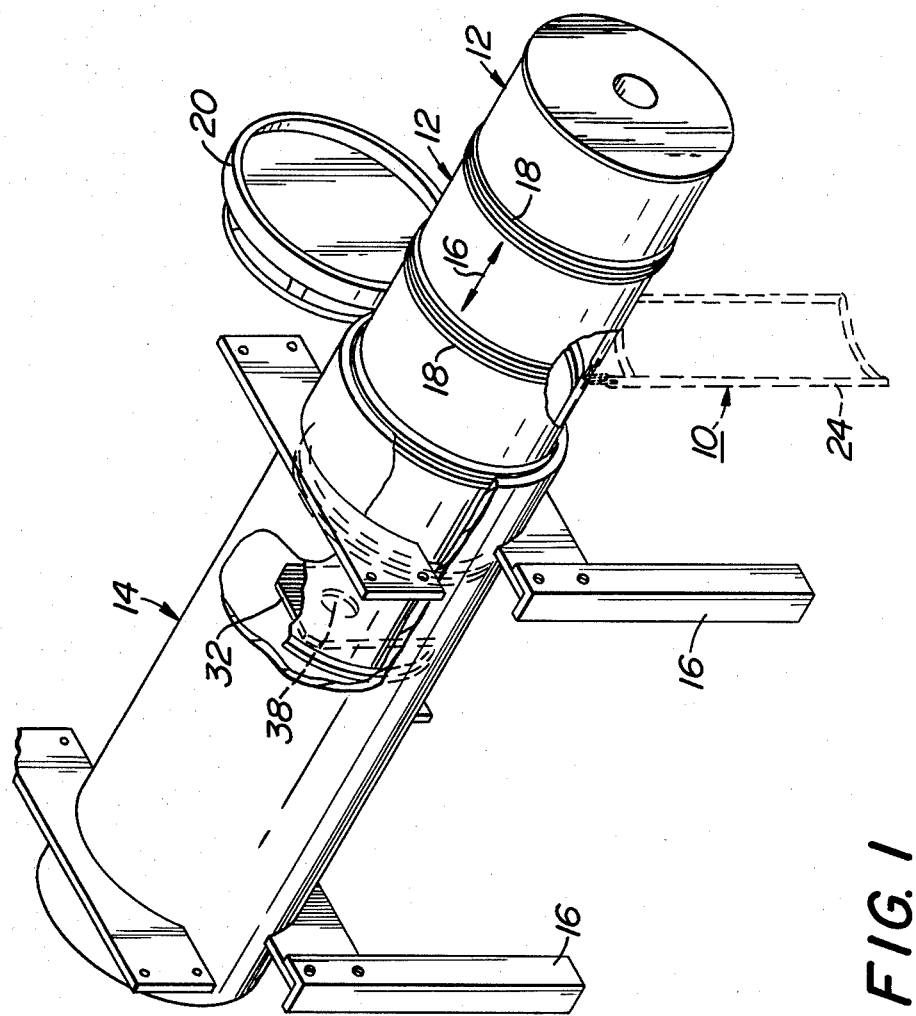
FIG. 1 is a perspective view of a purification system showing the cradle system in both a longitudinally extended direction and a rotationally activated position.

Referring now to FIGS. 1-4 there is shown cradle system 10 generally utilized for releasably capturing and allowing reversible displacement of a set of filter cartridges 12 maintained within filter tube tank 14. In overall concept, cradle system 10 is used in an overall filtration system which includes filter cartridges 12, as well as filter tube tank 14. Such filtration systems may be used in a number of industries, one in particular being the dry cleaning establishments. The prime function of the filtration system is to maintain a constant flow of solvent which is generally free of any excessive non-volatile residue as well as other contaminants. Filter tube tank 14 is mounted to a base surface through a tube tank frame including tank legs 16.

A plurality of cartridges 12 are insertable within filter tube tank 14 in longitudinal direction 16. In general, filter cartridges 12 are formed of resin coated filter paper which may be specifically designed for dry cleaning solvents. Cartridges 12 provide mechanical filtration of insoluables and may include an inner core of absorptive granules which attract non-volatile residue, fatty acids, dyes, excess moisture, as well as other types of contaminant particles.

Cylindrically contoured filter cartridges 12 when being inserted within filter tube tank 14 are generally aligned each with respect to the other and have a coincident axis of revolution. Cartridges 12 are spaced each from the other by gaskets 18 as is clearly seen in FIG. 1. Gaskets 18 may be formed of a felt like composition and are generally disk-like in contour having a gasket through openings alignable with longitudinally directed through openings formed in cartridges 12. In this manner, a plurality of filter cartridges 12 are insertable within filter tube tank 14.

Once inserted, filter cartridges 12 in operational use are maintained internal to filter tube tank 14. Door member 20 is rotational actuated to seal the internal chamber of filter tube tank 14 from the external environment.

Filter tube tank 14, as well as filter cartridges 12 are not part of the inventive concept as is herein provided but are referred to in order to show utilization of cradle system 10 of the subject inventive concept.

Figure 2:
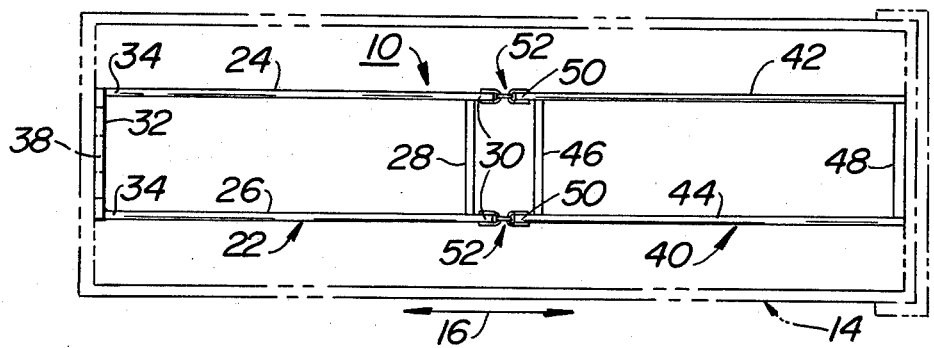
FIG. 2 is a top view of the cradle system mounted within the filter tube tank.
Figure 3:
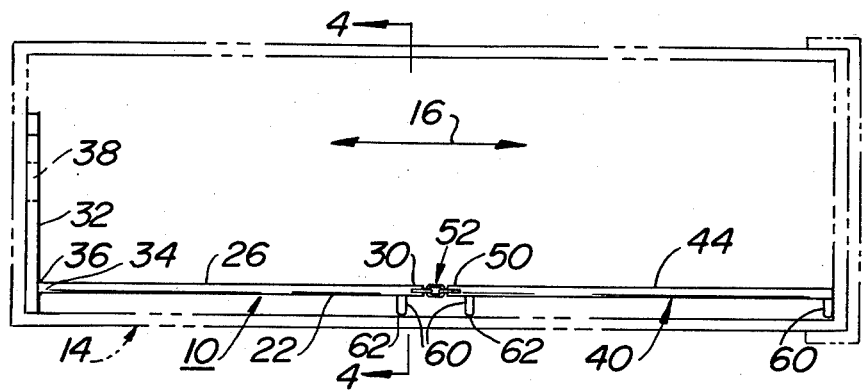
FIG. 3 is a side view of the cradle system as shown in FIG. 2.
Figure 4:
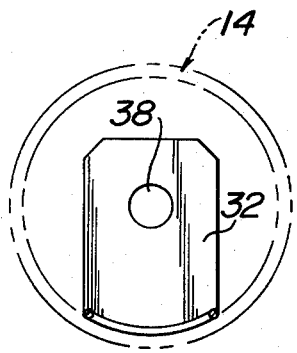
FIG. 4 is a sectional view of the cradle system taken along the section line 4—4 of FIG. 3.

Referring now specifically to FIGS. 2 and 3, cradle system 10 includes first longitudinally extending cradle frame 40. First cradle frame 40 includes longitudinally extending and transversely displaced first rod members 42 and 44. Each of first rod members 42 and 44 are fixedly secured each to the other through a pair of first transverse rods 46 and 48 in order to maintain parallel relation of first rods 42 and 44 throughout the longitudinal extension of first cradle frame 40. First transverse rods 46 and 48 may be welded on opposing transverse ends thereof to first rod members 42 and 44 or otherwise secured in some like manner not important to the inventive concept as is herein described. As can be seen in FIG. 2, first transverse rod 46 is mounted on second end section 50 of first cradle frame 40, and transverse rod 48 is mounted at the frontal section of cradle system 10.

In operation, filter cartridges 12 are inserted between rod members 42 and 44 of first cradle frame 40. First rod members 42 and 44 are transversely displaced each from the other by a predetermined distance for intercepting one or more filter cartridges 12 throughout the longitudinal extension of the filter cartridges 12. The predetermined transverse distance of first rod members 42 and 44 is a chord length which is less than a diameter of the cylindrically contoured filter cartridges 12. In this manner, as is seen in FIG. 1, cartridges 12 may be inserted and mounted on first rod members 42 and 44 and maintained in a releasable manner thereon.

Cradle system 10 further includes at least second longitudinally extending cradle frame 22 as is clearly shown in FIGS. 2 and 3. Second cradle frame 22 includes a pair of longitudinally extending and transversely displaced second rod members 24 and 26. Second rod members 24 and 26 are secured each to the other through second transverse rod 28. Transverse rod 28 is secured on opposing ends thereof through welding or some like technique not important to the inventive concept as is herein described with the exception that second rod members 24 and 26 must be fixedly secured each to the other in the manner shown in the figures. In this manner, there is provided a secondary cradle frame 22 for the containing of filter cartridges 12.

Each of second rod members 24 and 26 extend in longitudinal direction 16 and generally form a plane with the respective second transverse rod 28. As was the case with first rod members 42 and 44, second rod members 24 and 26 are transversely displaced each from the other by a predetermined transverse distance for intercepting filter cartridge 12 throughout a longitudinal extension of each filter cartridge 12. The transverse predetermined distance between second rod members 24 and 26 may be defined as a chord length dimension which is less than a diameter of cylindrically contoured filter cartridges 12. In this manner, cartridges 12 may be inserted on both first cradle frame 40 and second cradle frame 22 and such through the aid of gravity assist would be releasably captured or contained within frames 40 and 22.

Second cradle frame 22 further includes rear wall 32 which is fixedly secured to second end section 34 of second cradle frame 22. As can be seen in FIG. 3, rear wall 32 extends substantially normal to a plane formed by second rod members 24 and 26. Rear wall 32 may be secured to rod members 24 and 26 through weld joint 36 or some like technique not important to the inventive concept as is herein described with the exception that rear wall 32 be fixedly secured to second rod members 24 and 26. In this manner, second cradle frame 22 is formed into a one piece construction structure which is adapted for holding cartridges 12.

Rear wall 32 further includes through openings 38 which is alignable with a through opening passing in longitudinal direction 16 of filter cartridges 12. Through opening 38 in rear wall 32 as well as axially directed through openings of cartridges 12 are utilized for insert of a central tube member not important to the inventive concept.

Figure 5:
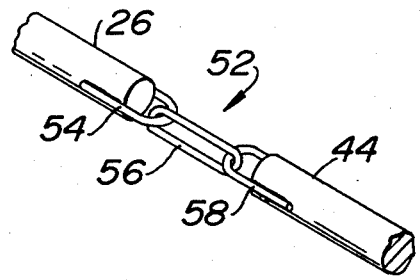
FIG. 5 is a perspective view partially cut away of the cradle rotational securement mechanism.

Referring now to FIGS. 2, 3 and 5 there is shown cradle rotational securement mechanism 52 which is coupled to first end section 30 of second cradle frame 22 and second end section 50 of first cardle frame 40. In practice, cradle rotational securement mechanism 52 constrains first rod member 42 to second rod member 24 and first rod member 44 to second rod member 26 of respective first and second cradle frames 40 and 22. In this manner, longitudinal displacement of first frame 40 causes a responsive displacement of second cradle frame 22 within filter tube tank 14.

Cradle rotational securement mechanism 52 may be formed of a plurality of chain linked elements 54, 56 and 58. As is seen in FIG. 5 first chain link 54 is secured to second rod member 26 of second cradle frame 22. Third chain link member 58 is similarly fixedly secured to first rod member 44 of first cradle frame 40. Second chain link member 56 formed in closed contour passes through loops formed by first and third chain link members 54 and 58. In this manner second rod members 26 and first rod member 44 are constrained each to the other. Similarly, second rod member 24 may be secured to first rod member 42.

The importance of this type of coupling is clearly seen in FIG. 1 where first cradle frame 40 is rotational displaceable with respect to second cradle frame 22. As shown in phantom line drawings in FIG. 1, first cradle frame 40 upon being removed from internal to filter tube tank 14, may be downwardly displaced with respect to second cradle frame 22. This locational actuation is provided by cradle rotational securement mechanism 52. Thus, a very important aspect of the subject inventive concept is provided wherein the total number of cartridges 12 do not have to be longitudinally removed from filter tube tank 14. In the case, where filter tube tanks may have a length of a multiplicity of feet, the removal of cartridges 12 may be accommodated in a much smaller volume space. Additionally, as is clearly seen from the phantom line drawings shown in FIG. 1, cartridges 12 may easily be worked upon or otherwise removed with a simplicity which is not provided where a continuous frame is utilized throughout the longitudinal extension of filter tube tank 14.

Additionally, in purification systems where cradle system 10 is utilized there is generally contaminant particulates formed on an inner surface of filter tube tank 14. Through gravity assist, these particulates will generally fall to a lower internal surface area of tanks 14. In order to facilitate any cleaning operation and to remove contaminant particulates when cradle system 10 is longitudinally displaced external to tube tank 14, scraper elements 60 shown in FIG. 3 may be fixedly secured to first rod members 42 and 44 and second rod members 24 and 26. Scraper elements 60 generally extends below first rod members 42 and 44 as well as second rod members 24 and 26 and includes arcuately contoured lower surfaces 62 for contiguous interface with an inner surface of filter tube tank 14. Each of scraper elements 60 includes a substantially circularly contoured lower surface 62 forming a circular segment having a radius substantially equal to a radius of the inner surface of filter tube tank 14.

In this manner, when cradle system 10 is removeably displaced in longitudinal direction 16 from internal tube tank 14, scraper elements 60 substantially drive or push particulate contaminants to the frontal section of tube tank 14 where they may be removed from the overall purification system.

Rear wall 32 extends below second rod members 24 and 26 and has an arcuately contoured lower surface for contiguous interface with an inner surface of filter tube tank 14. The arcuately contoured lower surface of rear wall 32 includes a substantially circular contour forming a circular segment having a radius substantially equal to a radius of the inner surface of tank 14. Additionally rear wall 32 extends in a downward manner substantially the same distance as each of scraper elements 60. The lower arcuate surface of rear wall 32 may then act as a scraper element for removal of particulate material internal to tube tank 14.

Scraper elements 60 may be secured to transverse rods 28, 46, and 48 or alternatively rods 28, 46 and 48 may be arcuately formed in their extended direction. The arcuate contour of transverse rods 46 and 48 are clearly seen in phantom line drawing of FIG. 1. The arcuate contour allows rods 28, 46 and 48 to contiguously interface with an inner surface of tank 14 and possibly dislodge particles therein. In this manner, second rod members 24, 26 and first rod members 42, 44 lie in a substantially horizontal plane when inserted within filter tube tank 14.

Other embodiments and modifications of the present invention will readily come to those of ordinary skill in the art having the benefit of the teachings presented in the foregoing description and drawings. It is therefore to be understood that this invention is not to be limited thereto and that said modifications and embodiments are intended to be included within the scope of the appended claims.

What is claimed is:

1. In combination with a horizontal filter tank for enclosing cylindrical filter cartridges therein, first support means for said filter cartridges comprising a first set of spaced apart parallel members constructed and arranged for sliding movement along a lower portion of said filter tank in an axial direction thereof, second support means for said filter cartridges comprising a second set of spaced apart parallel members for said filter cartridges, said first and second sets of spaced apart parallel members being axially aligned with rotational connecting means connecting an end of said first support means with an adjacent end of said second support means, at least one cylindrical filter cartridge constructed and arranged with a horizontal axis thereof paralleling said parallel members and supported by said members.

2. In the combination as recited in claim 1 where said first and second set of spaced apart parallel members of said first and second support means are transversely displaced by a predetermined distance for intercepting said filter cartridge, said predetermined distance being a chord length less than a diameter of said cylindrical filter cartridge.

3. In the combination as recited in claim 1 where said rotational connecting means includes a chain link coupling member displaceably secured to said adjacently located ends of said first and second support means.

4. In the combination as recited in claim 2 where said second support means includes a rear wall member fixedly secured to an end section of said second support means, said rear wall member extending substantially normal a plane formed by said second set of spaced apart parallel members.

5. In the combination as recited in claim 4 where said rear wall member includes a rear wall through opening, said rear wall through opening being aligned with a filter cartridge through opening when said filter cartridge is supported by at least one of said first and second support means.

6. In the combination as recited in claim 4 where said rear wall member extends below said second set of spaced apart parallel members, said rear wall member having an arcuately contoured lower surface for contiguous interface with an inner surface of said filter tank.

7. In the combination as recited in claim 6 where said rear wall member arcuately contoured lower surface includes a substantially circular contour forming a circular segment having a radius substantially equal to a radius of said inner surface of said filter tank.

8. In the combination as recited in claim 1 including at least one scraper element fixedly secured to said first set of spaced apart parallel members, said scraper element extending below said first set of spaced apart parallel members and having an arcuately contoured lower surface for contiguous interface with an inner surface of said filter tank.

9. In the combination as recited in claim 1 including at least one scraper element fixedly secured to said second set of spaced apart parallel members, said scraper element extending below said second set of spaced apart parallel members and having an arcuately contoured lower surface for contiguous interface with said inner surface of said filter tank.

10. In the combination as recited in claims 8 or 9 where each of said scraper elements includes a substantially circular contoured lower surface forming a circular segment having a radius substantially equal to a radius of said inner surface of said filter tank.

* * * * *